Dec. 30, 1924.
F. C. SMART
1,520,969
RIGID ACTION SCROLL AND JAW SLIDE LATHE CHUCK
Filed Aug. 16, 1923  6 Sheets-Sheet 1
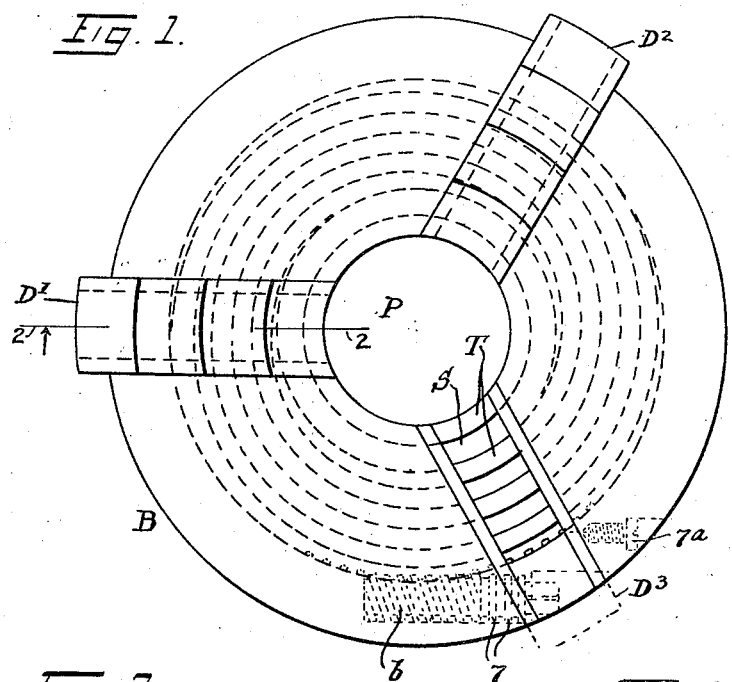
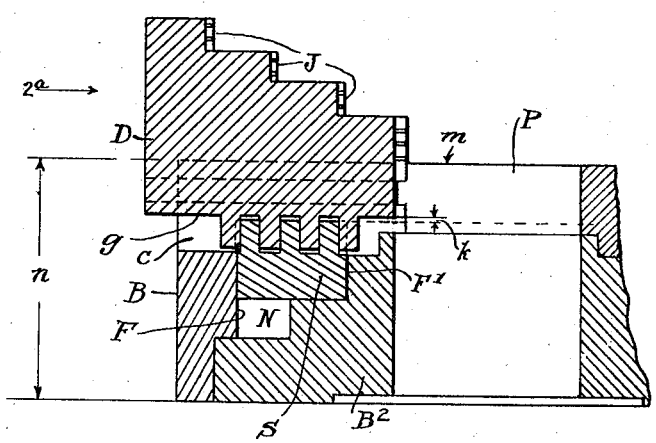
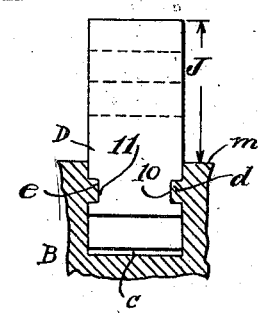
Inventor:
Frank C. Smart,
By his Atty, Dec 30, 1924.
F. C. SMART
1,520,969
RIGID ACTION SCROLL AND JAW SLIDE LATHE CHUCK
Filed Aug. 16, 1923   6 Sheets-Sheet 2
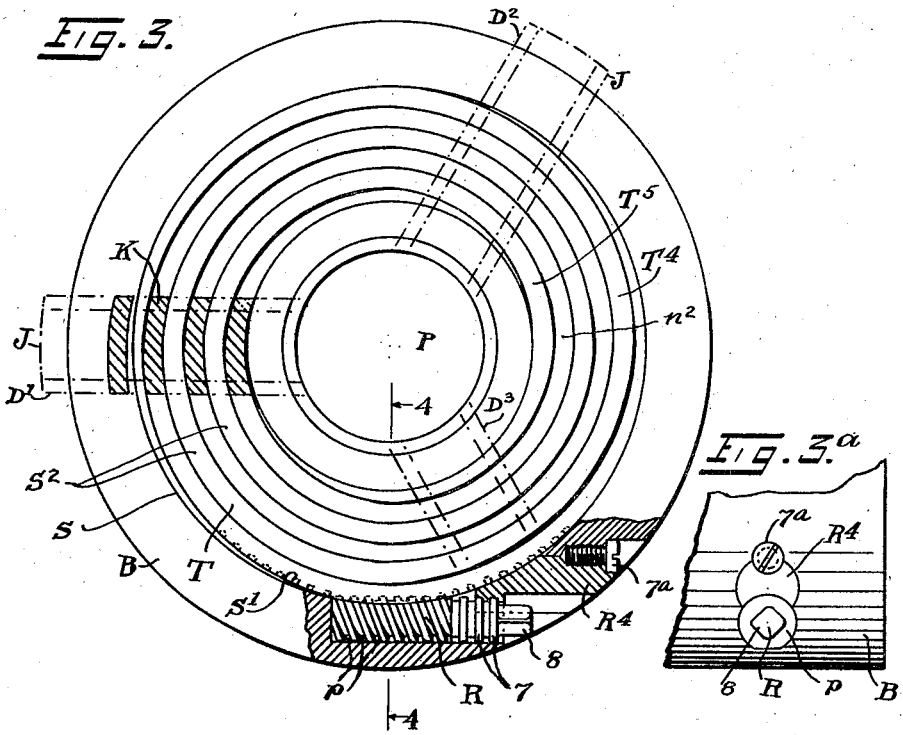
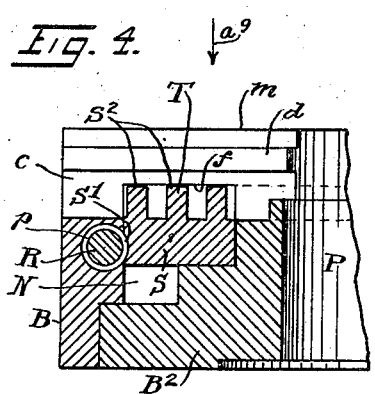
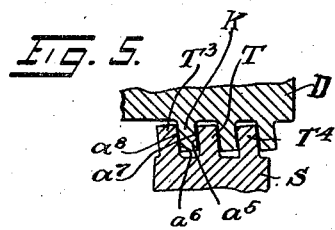
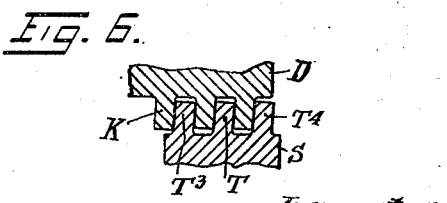
Inventor:
Frank C. Smart,
By his Atty,  F.H.Richards.

Dec. 30, 1924.  
F. C. SMART  
RIGID ACTION SCROLL AND JAW SLIDE LATHE CHUCK  
Filed Aug. 16, 1923  
1,520,969  
6 Sheets-Sheet 3
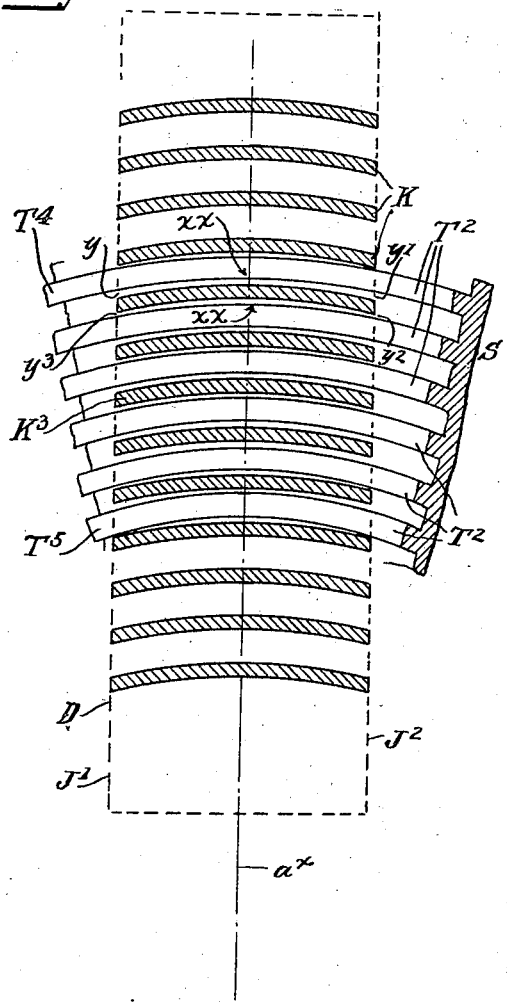
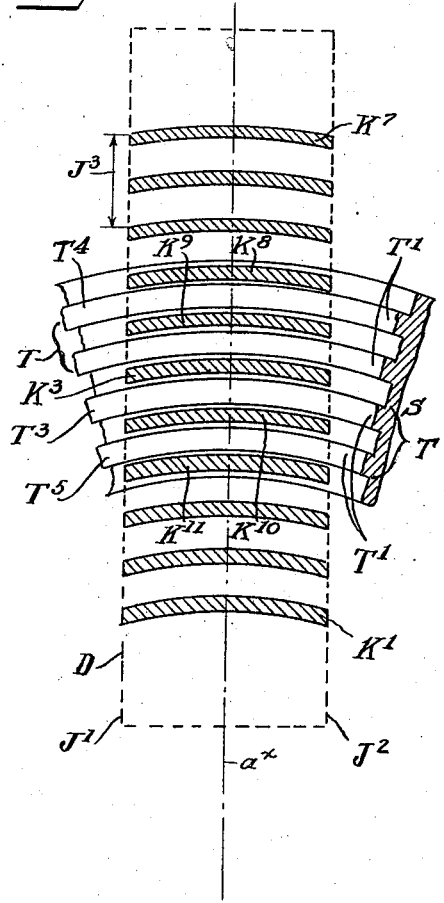
Inventor:  
Frank C. Smart,  
By his Atty, Dec. 30, 1924.
F. C. SMART
1,520,969
RIGID ACTION SCROLL AND JAW SLIDE LATHE CHUCK
Filed Aug. 16, 1923　　6 Sheets-Sheet 4
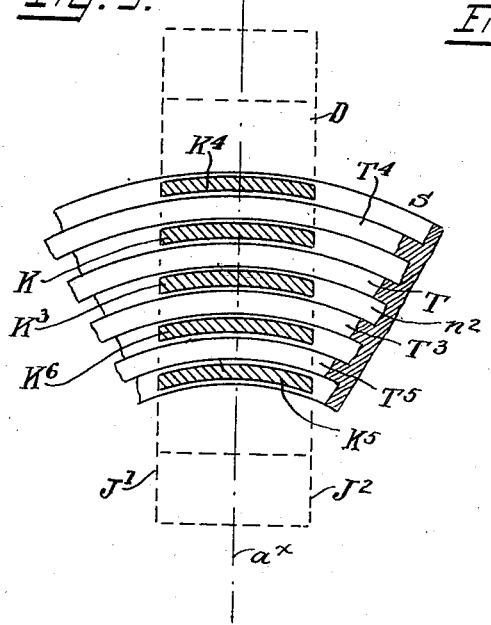
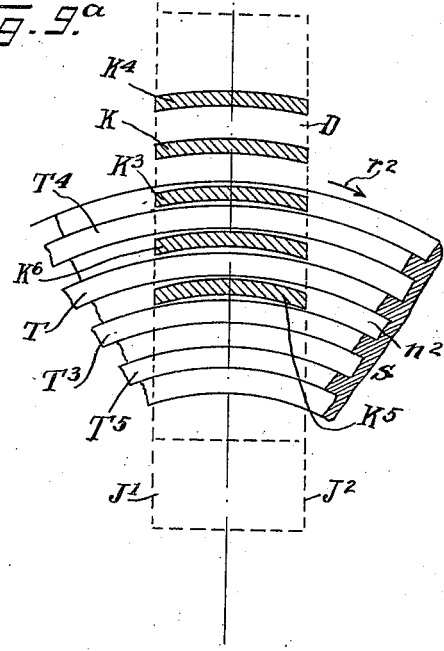
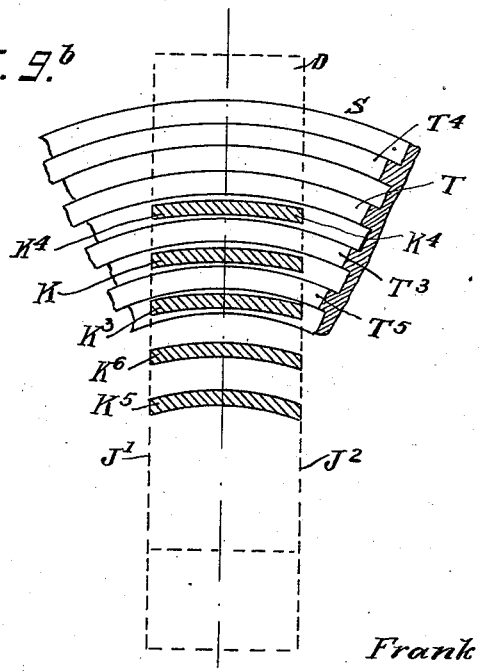
Inventor:
Frank C. Smart,
By his Atty, Dec. 30, 1924.
F. C. SMART
1,520,969
RIGID ACTION SCROLL AND JAW SLIDE LATHE CHUCK
Filed Aug. 16, 1923
6 Sheets-Sheet 5
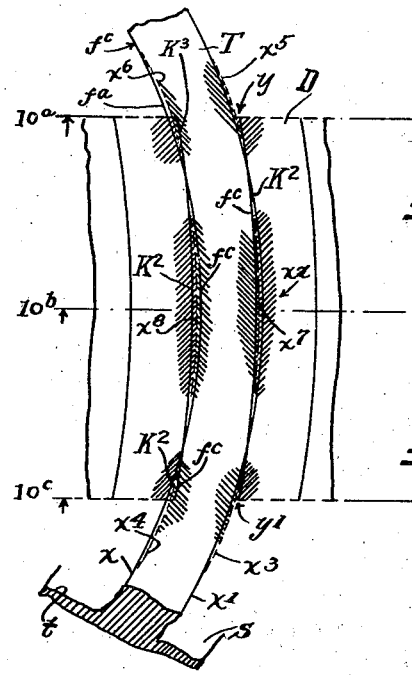
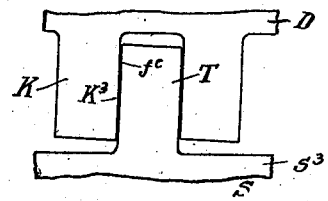
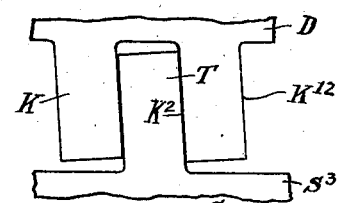
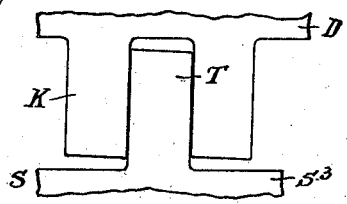
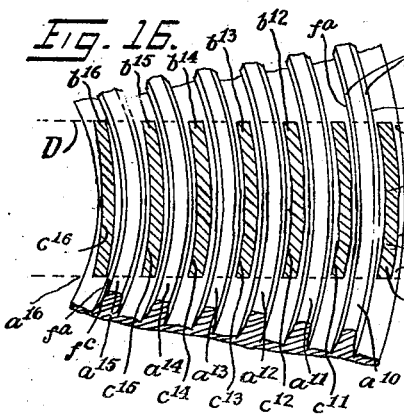
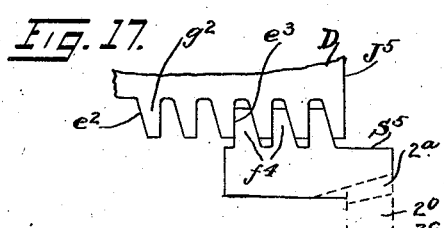
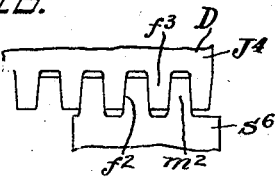
Inventor:
Frank C. Smart,
By his Atty,

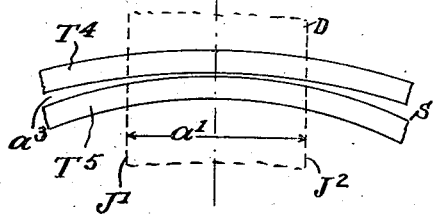
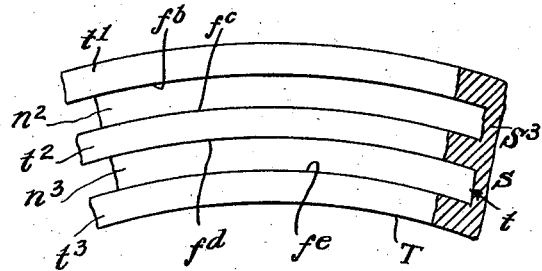
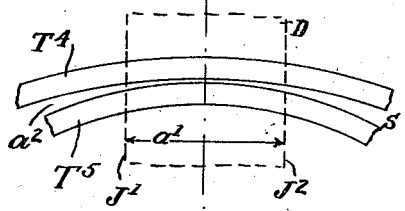
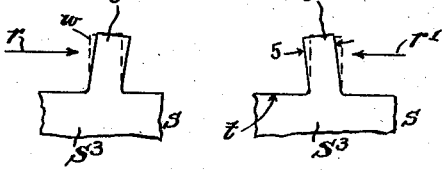
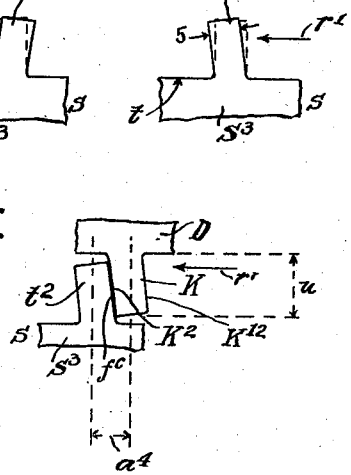
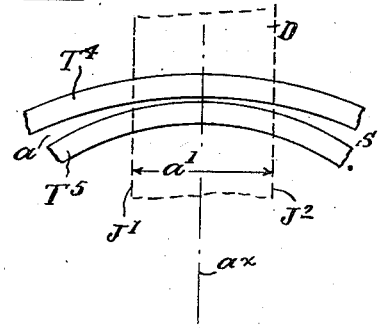
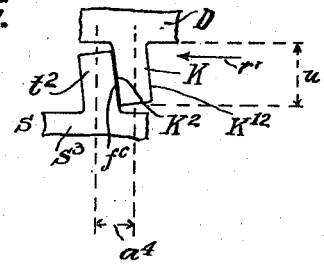

Patented Dec. 30, 1924.

1,520,969

UNITED STATES PATENT OFFICE.

FRANK C. SMART, OF HARTFORD, CONNECTICUT.

RIGID-ACTION SCROLL AND JAW-SLIDE LATHE CHUCK.

Application filed August 16, 1923. Serial No. 657,718.

*To all whom it may concern:*

Be it known that I, FRANK C. SMART, a citizen of the United States, residing in the city of Hartford, in the county of Hartford and State of Connecticut, have invented certain new and useful Improvements in Rigid-Action Scroll and Jaw-Slide Lathe Chucks, of which the following is a specification:

This invention relates to that class of chucks commonly designated as "lathe chucks" but which in practice are available, or readily adaptable, for use on a wide variety of machines, including machine tools, and for various special purposes. The invention also relates, especially, to lathe-chucks having scroll-and-jawslide mechanism arranged, fitted and proportioned for a rigid-action, or inter-action, of a plurality of long-stroke jaw-slides, or carriers, each relative to another or to others.

Accordingly it is a leading object of the present improvements to furnish an improved multi-jaw chuck of the "scroll" type, and which shall have the members of the scroll-and-jawslide mechanism so combined and operable as to overcome, or avoid, certain limitations heretofore found in the ordinary chucks of the "scroll chuck" class.

In this connection it will be remembered that the ordinary chuck-jaw-actuating scroll-ring is provided with an involute form of thread, or spiral rib, (coinciding with the involute of a small axially positioned circular evolute), which thread or rib extends several times around upon the face of the scroll-ring and operably engages each of a series of jaw-slides that usually are (or may be) disposed radially, or nearly so, to the axis of the chuck. This engagement of the scroll-thread with these slides has heretofore been effected by providing each said jaw-slide with a series of rigid projecting "teeth" or short bearing ribs which can enter the scroll-channel, this being formed between successive turns of the scroll-thread. These successive turns of said thread, increase rapidly in curvature in passing from the outer circumference of the scroll-ring toward the center thereof, so that the usual requirements, in practice, as regards stroke of the work-holding jaws, make it necessary to give the jaw-slide tooth-faces a large amount of "relief", (this being done by cutting away portions of said faces in a well known manner) so that each said tooth may freely pass along between both the larger and the smaller pairs of turns of the scroll-tread. This construction results in restricting the extent of the actual bearing of said teeth upon a series of said turns, to a narrow area, each said slide tooth only having, in practice, a contact commonly designated by mechanics as a "line bearing", as contra-distinguished (especially in the art of precision tools) from a true "surface bearing". Consequently when a heavy pressure is applied longitudinally to such slidable chuck-jaws, the force thereof is so concentrated upon such small areas that very often the said thread and tooth surfaces are unduly worn, or actually flattened by the pressure while all those contacting surfaces are impaired by the destroying of their precision. Also, it will be noted, that when such a heavy pressure is applied to such small bearing surfaces, this pressure is gradually increased in intensity while the scroll-ring is rotating, so that the resultant friction upon the small, or "line-bearing", areas becomes an intensely abrading effect, and operates to rapidly wear away the several surfaces and thereby destroy the precision of the jaw positions, and thus also destroy the value of the chuck as a precision tool.

In one well-known and special class of chuck-mechanisms, (as illustrated in numerous prior patents), the aforesaid limitations and defective action has been avoided by the substitution on the actuating-ring and for said scroll-thread, of inclinedly-positioned pairs of circular-arc and concentrically-disposed bearing-faces forming the sides of cam-like channels that are formed in the ring. The jaw-slides, (in this special class) are usually provided each with a tooth-member connected thereto by means of a strong stud or pivot fitted to turn in or relatively to the slide, while the tooth-end portion thereof is curved to fit and slide closely in said circular-arc channel, and thereby furnish an extended pressure-bearing under a surface-to-surface contact. This kind of slide-actuation is largely employed in certain classes of screw-threading machines for operating tool-carrying slides which are radially movable upon a rotatable body-member that is carried on the lathe spindle. Thus the described and extended "surface" contact is here obtained (in said special class) only by adopting a non-integral connection of the arc-form "tooth" with the slide, and thereby sacrificing the rigidity normally resulting from the integral construction of the jaw-slide and its teeth as commonly used in the ordinary scroll-actuated lathe chucks. In the present improvements, (as will now be more fully explained) the desired surface-to-surface contacts are effectively obtained while retaining said integral construction of the jaw-slide and its scroll-engaging teeth, these teeth however, being of a special character providing for an inter-flexuring action thereof in connection with the scroll-thread of the slide-actuating scroll-ring.

In view of the foregoing explanations of well known features, phenomena, and conditions, (long since well understood in the manufacture and use of precision tools, to which class my present improvements belong), it is a further and leading object of the present improvements to furnish for precision purposes, a chuck having long-stroke jaw-slides which are scroll-thread-actuated and radially movable, and in which the mechanism shall be so organized, proportioned and operable that each jaw or slide may have a continuous and actual working surface-contact with a plurality of scroll-thread turns, and through a series of extended pressure-transmitting surfaces that may be made without "relief." By means of this peculiar feature and the mode of action thereof,—as hereinafter more fully explained,—the actuating force may be transmitted to said jaw or slide through surfaces extending along substantially the whole length of the jaw-teeth, so that, in practice, said surfaces are in the aggregate so large that these can now be lubricated for effectively reducing the friction to a point insuring the avoidance of the "abrading" effect, or so-called "biting" action, hereinbefore mentioned. Thus I attain not only an improved mode of action, but also a practically permanent precision of operation under long-continued use.

In a mechanism organized in accordance with the present improvements, the body-member,—whether this is a form usable for a rotatable mechanism or for a nonrotatable one,—is a combined scroll-carrier and slide-carrier. For serving these purposes, said body-member is provided with scroll-guiding faces, or bearing surfaces, whereby to retain a slide-actuating scroll in proper location on or relatively to said body-member during an actuation of the scroll; and, is also provided with slide-guiding means arranged for holding in place and guiding one or more scroll-actuated slides, these being usually operable in a direction radial or nearly so, to the axis of scroll-rotation, as common, for instance in various well-known kinds of pipe-threading, work-guiding and work-holding chucks.

In this art, one of the leading varieties of said rotatable form of the mechanism is the "lathe-chuck," this being usually removably-attached upon a lathe-spindle and provided with not less than two, and not more than three scroll-actuated slides in the form of, or equipped for use as, work-holding "chuck-jaws" slidable toward and from a common center which, preferably and usually, is in the axis of the chuck-rotation. A series of such chuck-jaws are usually located at uniform intervals, or arcs, around the circuit of the chuck-body, and on their inner ends provided with suitable work-engaging faces or devices; in some instances, (as already indicated) such jaws are thus provided (or equipped) with metal-cutting tools, as, for instance with tools in the form of thread-cutting dies when the chuck is for use on a screw-threading lathe, or the like.

In this and other analogus varieties of this multislide chuck, usually all the slides are operated simultaneously and by equal amounts, but in some instances,—in a series of two or more such slides,—one of these is adjustably-fixed in a working position, while the others of them are simultaneously actuated. In other instances,—especially in such mechanisms having three slides,—two of said slides are adjustably-fixed as described while only one said slide (or in some such cases, a plurality of slides) is operable by the slide-actuating scroll in relation to the adjustably-fixed slide or slides; but, these adaptations being well understood, are not herein specially illustrated.

Since, in the various said forms of multi-slide chucks, an opening or passageway for the work (and usually of a considerable diameter) is generally required to be located centrally of the series of slides and to extend entirely through the body-member or frame, the slide-actuating scroll is therefore regarded as being of (or comprising) an annular form, and hence, for convenience of description, the scroll member is herein designated as the scroll-ring, whatever may be, specifically, its actual structural form or its particular means for rotative support and guidance. In any form of said scroll-carrying member, the series of scroll-thread turns only needs, in practice to comprise a few of these turns, and consequently, these thread-turns may be said to be located within an annular zone, this zone being regarded as concentric to the chuck axis, and being normally of this particular "ring" form, and also relatively narrow radially of the body-member.

In the course of the following description further objects and advantages will be pointed out in connection with the accompanying drawings, in which—

Fig. 1 is a plan view,—also sometimes designated as a face-view,—of a rotatable lathe chuck, here represented as being of one of the smaller commercial sizes, and as having the operable parts thereof arranged in accordance with the present improvements; in this view one of the jaw-slides is indicated as being removed, or omitted, its normal being shown by a dotted line at $D^3$.

Fig. 2 is a sectional view, in line 2, 2, Fig. 1, as seen from below in Fig. 1; this sectional view shows the jaw-slide D, as being in a mid-stroke position, and as having the slide and jaw portions thereof made integral.

Fig. $2^a$, shows an end elevation of one of the jaw-slides D as seen from the left-hand,—as per arrow $2^a$,—in Fig. 2, and illustrates an ordinary mode of slidably engaging such slides with the body-member B.

Fig. 3 is a view similar in arrangement to Fig. 1, but diagrammatic in character, for illustrating certain of the operable features hereinafter explained.

Fig. $3^a$ is a view of, and in alinement with, a portion of Fig. 3, (also of a portion of Fig. 1), as seen from the right-hand in Fig. 3; this view shows in end-view the form of ring-actuating screw R which is shown in side-view in Fig. 3, and in cross-section in Fig. 4.

Fig. 4 is a sectional view similar to Fig. 2, but with the jaw-slide omitted.

Figs. 5 to 18 inclusive, are a series of diagrammatic illustrations hereinafter explained in detail, and which, being read in connection with the description thereof herein referring directly or indirectly to said figures, respectively, are intended for exhibiting (generally in an enlarged form) the more important of the features and coactive relations that are either essential or incident to the peculiar inter-flexuring of the jaw-teeth and the means for jaw-actuation.

For convenience of illustration, my present improvements have been shown in Figs. 1 to 4, inclusive, as being applied to a simple style of three-jaw chuck heretofore frequently adopted for the smaller sizes of ordinary lathe-chucks having scroll-actuated jaws. In Fig. 1, the body member, B, is of an annular form, and is shown arranged for carrying three radially-disposed and scroll-actuated slides, $D^1$, $D^2$, $D^3$, which are here indicated as being equally spaced apart in the circuit of said body member, and also as being each arranged for movements directly toward and from the axis thereof. However, it should be understood that said spacing and direction of slide movement may be somewhat varied as occasion may, in practice, require.

The slides D are herein shown (except as to the scroll-engaging teeth thereof) in the form of ordinary work-grasping chuck-jaws, but when so desired these slides may be made plain on the forward sides thereof, and be fitted to receive removable jaws, (either reversible or otherwise, but not herein shown), or to receive such special jaws, tools or other devices as occasion may require, in accordance with a well-known practice.

Thus in Figs. 2, $2^a$, that portion of the combined slide and jaw which lies below the line $m$, may be regarded as constituting the "slide," or jaw-carrying slide, while the portion thereof shown above said line $m$ is the "jaw," or work-engaging part of the "jaw-slide," whether this may be of an ordinary integral construction as here illustrated, or shall be of some well-known composite, or compound construction.

Accordingly, in connection with the present purposes and the present scroll-and-slide mechanism, the slide D is regarded as being a "jaw-slide," whether or not this slide member shall, in any given instance, be actually equipped with work-holding or other appliances, since, (as is well-known in this art), various forms of chuck slides are adapted, or are readily adaptable, for having applied thereto, or having formed mounted thereon, (either fixedly or removably), one or another of a wide variety of such appliances. It should also be noted that the terms "jaw" and "jaws" may be used, especially in the aforesaid connection, in place of or as equivalent to "jaw-slide" and "jaw-slides," respectively, it being understood that a work-holding means or the like requires, in practice, to be provided with, or suitably associated with, some proper guiding means therefor. Thus, for the latter said purpose, the jaw portion J may be considered as being provided with a slide-way form of guiding means comprising the guide ribs 10, 11, (on the slide portion D), which closely engage in corresponding channels, as $ae$, respectively, formed in the body-member B, preferably substantially as indicated in Fig. $2^a$.

In view of the foregoing illustrations, it will now be evident that the scroll-actuated slides, $D^1$, $D^2$, $D^3$, may be properly designated simply as "slides," or as "jaw-slides," and may also, any plurality of them, be designated as "slides D," and individually but without choice, as "slide D." Similarly, the scroll-thread-engaging "teeth," as K, (with which said slides are provided, and which the hereinafter more fully described), may be designated as "teeth K," and individually but without choice, as "tooth K."

Referring now, to Figs. 1, 2, 2ª and 4, it will be seen on comparison thereof, that slides D are here shown assembled on the rotatable body-member B after the manner of an ordinary kind of chuck-jaws, each said slide being operably fitted into a radially-disposed slide-way, as $c$, having the oppositely-disposed and parallel guide ribs, or ways, $d$, $e$, for closely but operably engaging in the channels 10, 11, respectively, of said slide D. These engaging members should, in practice, and in any particular instance, be designed, as to their specific forms, dimensions and proportions, for having strength and surfaces suitable for the size of chuck, and for the service to be performed thereby. To properly meet these conditions, will make it desirable in some instances, especially in chucks of extra large dimensions, or for extra heavy duty, to provide the side walls of the channels C with a plurality of the guides $d$, $e$,—this arrangement of them being one already well-known, but not herein specifically illustrated.

In the "lathe-chuck" form of scroll-and-slides mechanism selected for herein illustrating the present invention, the body-member,—designated in a general way by B,— is of the annular form already mentioned, and has centrally thereof the usual opening or passageway, P. Said member B has, or may have, an interior annular chamber, as N, (Fig. 2) within which the annular form of scroll-ring S, is to be closely fitted for rotative movement; this movement may be effected, in practice, by the use of any of the well-known scroll-ring-actuating devices, any such selected one to be, of course, suitably adapted and applied.

Said scroll-ring, S, is preferably supported, in chucks of the class herein shown and as against forces applied thereto radially of the body-member B, by the close fitting thereof within the outer annular slide-face F, and also by a similar fitting thereof outside of the inner annular slide-face $F^1$; thus said faces F, $F^1$, serve as co-acting guide-surfaces between which the ring S, while being actuated, moves along after the manner of a curved slide which, structurally, has been extended into a circle. In some instances, as when said radial forces are to be applied to ring S only in an outward direction the inner said guide-face, $F^1$, may be freely fitted or even may be omitted; but such a variation or omission is not deemed desirable in chucks intended for such variable uses as ordinarily required by machinists and tool-makers.

The forward plane, or boundary line, $f$, of the annular actuator-chamber N, is shown in Figs. 2 and 4, located rearwardly of the rearward plane, or boundary line $g$ of the radial slide-way $c$, by the relatively small distance $k$, so that in practice, an exact coincidence on the said two planes $f$ and $g$ may be avoided. By this means the machining operations for finishing the surfaces of said slide-ways $c$ and the annular chamber N may be separately and more readily performed, and without danger of so making said spaces N and $c$ that one of them will intersect or extend into the other. In making the said slide-ways it is deemed to be, in practice, a preferable method, to rigidly hold the body member B, upon a machine table, and with the face side, $m$, thereof accessible so that the slide-way spaces (for receiving the jaw-slides) may be readily finished out to full size and depth by the use of tools carried by the machine. Then, for finishing out the actuator-chamber N, the member B may be held with its face side, $m$, against the face plate of a lathe, while by means of suitable tools (such as commonly used in machine shops for analogous operations), and while the back-plate portion,—$B^2$ Fig. 2,—is removed, the said chamber space N may be turned out to full size and to a proper finish. Thus the two spaces $c$ and N, are (or may be) finished to size by operations proceeding from opposite sides, respectively, of the body member B; and, by providing for the described distance $k$ between the adjacent faces of those spaces, slight variations in the thickness, as $w$, of a series of said body members, becomes immaterial, since the said distance $k$ may be variable within sufficient limits for avoiding any actual interference.

For rotating the scroll-ring, the chuck may be provided with any one of the several ring-actuating devices which are already well-known or suitable therefor. For instance, the ring S may be provided on rearward side thereof with gear teeth (not herein shown) with which an ordinary manually-operable pinion may mesh. Or, said ring S may be provided with worm-wheel teeth, as $S^1$, (Figs. 3 and 4), meshing with the thread of an ordinary tangent-screw, as R, located in a suitably-formed bore or chamber, as P, in the body of the chuck. In Fig. 4, said screw or worm, R, is shown in cross-section, the location thereof in the circumferential portion of the chuck-body being further indicated by dotted lines, at $b$, in Fig. 1. In practice, of course, such a tangent-screw should be provided with suitable means for holding the same against longitudinal movement, as rings 7 and with a suitably-formed end-portion, or with a head as 8 (Fig. 3), whereby the screw may be operated by a wrench or like device, but, since such details of various kinds and arrangements are already well-known in this art, they need not be herein more particularly illustrated or described. However, in Figs. 3, 3ª, a plug R⁴ is shown instead in a socket formed in member B, and fitted to engage said collars 7, this plug being removably held in place by a screw 7ª, threaded into each of the parts B and R⁴.

When it is deemed preferable to employ the gear-and-pinion form of scroll-ring actuation, this operating means may be arranged substantially as set forth in the well-known United States patent to A. F. Cushman, No. 120,863, dated Nov. 14, 1871, or, there may be so employed any one of the several well-known modifications of said arrangement which are described in United States patents of a date later than said Cushman patent.

The scroll,—as usual heretofore in this class of chucks,—is herein shown consisting of a rim, or "thread", as T, which extends in a spiral line (as an involute) around and upon the scroll-face zone, or ring-face, S², through several revolutions, thereby forming a series of scroll-thread turns, each of which, in this series, is of a different curvature from the others. This well-known characteristic of the involute scroll-thread is such that, in lathe-chucks of the smaller sizes, as, for instance, those having scroll-rings not over ten or twelve inches in diameter, only a few thread-turns need be used; usually from three to five said turns will be found sufficient provided, of course, the cross-sectional size thereof shall not be too small for securing adequate strength, while thin enough to provide for effective inter-flexuring. When the chucks are of the larger sizes, such as now generally used on heavy machine tools, a proportionally larger number of said thread-turns may be necessary or preferable; also the cross-sectional dimensions of the thread may be relatively somewhat larger. For said smaller class, a thread-pitch of three per inch has been found suitable, but in some instances, a pitch of four, or two per inch often may be employed, provided of course, the metal used shall not be of a too rigid kind; but, in such instances, the height of the thread-turn section should be much greater than the thickness thereof radially of the chuck.

The height of the thread-turn arcs and slide-teeth, have been herein represented as being considerably greater than heretofore commonly used in scroll-chucks. In practice, however, the proportion of height, as $u$, and thickness, as $v$, (Fig. 15) may be arranged in accordance with the conditions existing in any particular instance, but, generally, it is deemed to be preferable to make said height $u$ greater than said thickness $v$, and a ratio of about two to one may, as a rule, be safely employed. One advantage of the said greater height ratio is the reduced angle thereby secured of the face-lines,—as at $f^c$ and K², (Fig. 15), relative to the vertical lines $w$, these being here shown to facilitate comparison. It will be obvious that if said height $u$, should be much reduced while the thickness, $v$, remains the same, said face-line angle (as shown by dotted line $w$) would be materially increased, and would thereby require a greater mobility of the metal, and modulation of forms, in order to make the flexuring action cover a given amount of base-line deviation, or divergence, which has been more fully described in connection with the several diagrams, including, especially, Figs. 7, 8 and 9.

The nature of the scroll-thread is further illustrated in the fragmentary view thereof in Fig. 12, wherein a series of turns are individually designated as $t^1$, $t^2$ and $t^3$, these being uniformly spaced apart, thereby forming between the pairs of turns,—as $t^1$, $t^2$ and $t^2$, $t^3$,—slide-way channels, as $n^2$, $n^3$, each located between oppositely disposed thread-faces, as $f^b$ and $f^c$, and $f^d$ and $f^e$, respectively. Said scroll-thread turns project from the front face, $t$, of the body portion, as S³, of the scroll-ring, (his being designated, as a whole, by S), so that each said turn as shown in this view is integrally joined at its base, with said body portion S³ and all of said turns are likewise joined to each other through said body portion.

One result of this construction,—as will be evident from a comparison of the drawings as described,—is that the top portion of each of said thread-turns (when these are properly proportioned therefor) may be forced or shifted in either direction (radially of the chuck) through a small distance limited by the elasticity and resistance of the metal of which the scroll-ring may be constructed. This feature is diagrammatically further illustrated in Figs. 13 and 14, in which the thread $t^2$ is shown integrally connecting at the lower edge thereof, at said surface $t$, with the body portion S of the scroll-ring.

The arrow $r$, in Fig. 13, indicates a thread-deflecting force applied to the top, at $w$, of the thread $t^2$, sufficient to flex the metal thereof into an inclined position, (which is here shown of an exaggerated proportion in order to obtain clearness of illustration). In the companion view, Fig. 14, a reverse application of such a force is indicated by the arrow $r^1$, the top, at 5, of the thread $t^2$ being here shifted toward the left-hand,—instead of toward the right-hand as in said Fig. 13.

If, now, said force indicated by arrow $r^1$, in Fig. 14, be applied through a jaw-slide D, (Fig. 15), having a projecting tooth K, similar in section to said thread $t^2$, and bearing against this thread, then it is evident said force must normally operate about equally upon the two engaging and reversely-positioned members $t^2$ and K, with the normal result of deflecting, or flexing, thread $t^2$ toward the left-hand while deflecting tooth K toward the right-hand, and thereby bringing the two faces $f^c$ and $K^2$ into a firm working contact and into an inclined position. Thus the relative positions of slide D and ring S shown in Fig. 15, may be obtained by the mutual flexing, as herein explained, of the projecting thread and tooth sections $t^2$ and K in opposite directions, respectively, although when not so flexed, those sections would obviously interfere each with the other by an overlapping relation thereof.

The aforesaid mode of action which is illustrated in Fig. 15 as occurring at one point, or position, in the circuit of a scroll-thread, may be applied thereto at successive circumferential positions, and may be so applied in the same direction at two such positions, and in the reverse direction at one position intermediate to those two. By this means, as I have discovered, two curved faces may be brought into a close working contact, or engagement, when the two said faces, of a scroll-thread and a jaw-tooth, respectively, are of different curvatures.

This arrangement, or system of construction and operation, is further illustrated in the enlarged diagram, Fig. 10, in which the single scroll-thread T is shown in a plan view thereof, three positions being designated, respectively, by the parallel dotted lines $10^a$, $10^b$, and $10^c$, drawn transversely across said thread. These dotted lines extend out to the diagrammatic views, Figs. $10^a$, $10^b$, and $10^c$, respectively, and there coincide with the face, $t$, of the ring S, so that these figures represent certain sectional arrangements occurring in the assembled mechanism at the intersections of the thread T by said lines $10^a$, $10^b$ and $10^c$, respectively.

In said Fig. 10, the position of the sides of the thread $f^c$ at the base thereof, is shown by the concentric lines $x$, $x^1$; and the base-lines $f^a$, $K^3$, indicate the outline and position of a jaw-tooth standing close beside said thread, T, but having a different curvature,—in this instance, a less curvature,—so that, normally, the two surfaces are separated at each end of the tooth, by the spaces at $y$ and $y^1$, respectively. Now, by deflecting the thread T outwardly at said positions $y$, $y^1$, and by curves indicated by dotted lines at $x^3$, $x^4$, and at $x^5$, $x^6$, as shown in the adjacent sectional views Figs. $10^a$ and $10^c$, the thread and tooth surfaces $f^c$ and $K^2$ are brought together as already explained in connection with Fig. 15. And, similarly, but reversely, the scroll-thread is shown by said lines $x^7$, $x^8$, to be there flexed inwardly instead of outwardly at said mid-length position $x$ $x$, and as compared with the adjacent sectional Fig. $10^b$, and the aforesaid Fig. 15, already explained. Thus the thread T and jaw-tooth K, although longitudinally of different curvatures, are here represented as being brought by a modulation thereof, into a surface-to-surface contact extending the whole length of the jaw-tooth; and the flexing is of a multiple, or compound nature, which may be designated as a "torsioned" formation, or as a torsionally-flexed tooth-form; and, that surface-to-surface "contact" is also a tensioned one, since a heavy pressure is applied to the contacting surfaces, in order to yieldingly bend,—or rather, to flex and hold,—the said members into the necessary modulations of their normal and deviating forms.

On comparing Figs. 7 to $10^c$, inclusive, and the foregoing explanations thereof, it will be seen that when a plurality of turns of the scroll-thread and a larger plurality of the jaw-teeth are forcibly intermeshed, (Figs 10, 15), the laterally unsupported top portions of each such series are contiguous to the integrally connected base portions of the other series, so that on being flexed as set forth, the one series becomes perfectly adjusted in form to the similarly adjusted form of the other series. Also, it will be noted, that in the two said series (or thread-turns and jaw-teeth) the described form-adjustment of each series by flexure of the several component members thereof, is effected through the instrumentality of the members of the other series, so that such adjustment and the complete surface-contact required, is initially obtained, and also normally maintained, independently of any force acting upon a jaw-slide either toward or from the chuck axis.

In practice, the amount of the described modulation, or form-adjustment by flexure as regards any particular jaw-tooth, depends, of course, upon the variation in the base-line curvatures of the thread and of the jaw-tooth, this variation being illustrated in Fig. 15 (also in Fig. 10) upon a magnified scale. This variation normally differs in accordance with the particular arrangement of the thread-turns and of jaw-teeth proportions which shall be adopted; and, hence, the extent and specific proportions of the flexure-forms are somewhat modified in chucks of the larger size, as compared with those of the relatively smaller sizes.

For use in the larger sizes of chucks, such as required for machine-tools on larger and heavier work, it is desirable to arrange the jaw-slides for having relatively long strokes, and hence the arrangement illustrated in Fig. 7 is deemed to be preferable for this service. In these larger chucks, the scroll-ring being of a relatively large diameter has a small curvature in the length of an arc whose length corresponds to the length of a jaw-tooth, and hence the jaw-teeth may properly be made curved on circular arcs. This curvature may correspond to the average curvature of the series of scroll-thread turns, so that the flexing of the teeth will be least in a mid-zone portion of the face of the scroll-ring, and will increase both inwardly and outwardly from said mid-zone, thereby reducing the otherwise maximum degree of such flexing to which any of the said intermeshing parts are subjected, as hereinafter more fully explained, especially in connection with Figs. 7, 8 and 9.

This system of construction and operation illustrated in said Fig. 7, has the advantage that all the jaw-teeth may be exact duplicates of each other, and that the aggregate amount, and the character of the flexing thereof, remain the same in all positions of a jaw-slide in which the set of jaw-teeth extends across the whole series of the thread turns. These advantages are deemed to be especially important in chucks having a diameter of more than one or two feet, and for the reason, among others, that when properly fitted the parts then may have a uniform frictional resistance, so that the workman may readily judge of the amount of force he is applying to the work held in the chuck. These features, and the base-line relations as preliminary to the inter-flexuring action will now be more fully explained, as follows:—

Referring now to Figs. 7 to 9$^b$, inclusive, these are five plan-view diagrams for further illustrating three forms, or specific arrangements of the scroll-thread and the series of coacting but deviating jaw-slide teeth. In these views, the usual complete and annular scroll-ring is represented by showing only an arc thereof, but sufficient for the present purposes. In Fig. 9, and in accordance with a common practice, the scroll-thread, T, of the scroll-ring S, is shown as being of the well-known single-pitch construction, and this form of said thread is deemed to be preferable for use in relative small chucks, as for instance, from four to ten inches in diameter and of the grade, as to fitting and material, suitable for ordinary tool-room uses.

In Fig. 8, the scroll-ring S, is assumed to be provided with a double-thread, comprising the two single thread-turns, as $T^1$ $T^1$, which extend together around the ring S, with a pitch double that of the thread T in Fig. 9. This arrangement is deemed to be especially suitable for chucks ranging from ten to eighteen inches in diameter, and of the grades suitable for ordinary machine-shop uses, since it gives a more rapid radial movement to the jaw-slides in proportion to the revolutions of the scroll-ring.

In Fig. 7, the larger scroll-ring S, is provided with a triple thread, comprising the single thread-turns $T^2$, $T^2$, which extend together around the ring S, with a scroll-pitch three times that of the single thread T in Fig. 9. This arrangement, Fig. 7, is deemed to be suitable for chucks of a wide range of sizes, particularly from fifteen inches and upward in diameter, and for use in the heavier classes of work; also, it will be understood that either the single-pitch or the double-pitch form of scroll-thread may be used, when suitably proportioned and fitted, in place of the triple thread, whenever so preferred.

A peculiar feature of these diagrams, Figs. 7, 8 and 9, is the direct and simple manner in which they are made to represent the base-line curvature relations of the slide-teeth with the coacting thread-turn arcs, and without obscuring the normal deviations thereof. For these purposes the several slide-teeth, K, are each shown as being of a width considerably less than their actual width as measured radially of the chuck, thereby eliminating, or omitting (for the purposes of these diagrams) the feature of torsional flexure and the distortion appearances which would result therefrom. The several slide-teeth are assumed to project downwardly from the jaw-slide, this member being removed,—or considered to be transparent,—while the width and position thereof is indicated by parallel side-lines, $J^1$, $J^2$, which may be regarded as rigidly connecting and holding in place a series of said reduced-width slide-teeth. By this means the side faces of said teeth are shown in edge-view only, and the curvatures thereof represent those of the slide-teeth base-lines. Thus, it is now easy to observe and to compare the respective and contrasting base-lines of the thread-turn arcs with the base-lines of said teeth.

For instance, in Fig. 7, one of the slide-teeth, K, stands between a pair of the thread-turn arcs $T^2$ and is in a deviating alinement whereby one space, as at $x$ $x$, is widest at the two end-positions (or points) at $y$ and $y^1$, while the nearest approach is in the mid-length position at $x$ $x$, but, on the opposite side of the teeth K, the space has the greatest width in the mid-length position at $x$ $x$, while the tooth-ends at $y^2$ and $y^3$, approach closely to the base-line position of the coacting arcs $T^2$. In a similar manner the base-lines of each of the slide-teeth may be compared with thread-turn arcs, respectively, which, when the teeth are of full thickness, are normally coactive therewith by the inter-flexuring action.

In the more restricted arrangement of the coacting thread-turns and slide-teeth shown in said Fig. 9, the outer said slide-tooth K, (when the slide D as there shown, is in the mid-stroke position thereof), is contiguous to and substantially conforms in curvature with, the outer thread-turn $T^4$, this being the one having the minimum curvature; and, the inner slide tooth, $K^5$, has a similar relation to the inner said thread-turn $T^5$, this being the one having the maximum degree of curvature. Thus, as here clearly indicated, the series (here four in number) of thread-turns, T, $T^3$, $T^4$ and $T^5$, have a regularly progressing increase of curvature, from said outer thread-turn $T^4$, inwardly to (and including) said inner thread-turn $T^5$; and, similarly, the series of slide-teeth, (here five in number), have a corresponding and regularly progressing increase of curvature from said outer slide-tooth, $K^4$, inwardly to (and including) said inner slide-tooth, $K^5$. Accordingly, it may be said that the mid-position one, $K^3$, of said series of slide-teeth (in the arrangement of Fig. 9) has a curvature that is intermediate,—in degree of curvature,—between the curvatures, respectively, of said inner and outer thread-turns $T^4$ and $T^5$; and, also, that in this mid-position series a plurality of said mid-series slide-teeth,—here shown comprising the three said teeth K, $K^3$ and $K^6$,—have each of them a curvature that conforms to a curvature that is intermediate (in degree of curvature) between the greater and the lesser curvatures, respectively, of said inner and outer thread-turns. Also, it will be seen that the curvature of the mid-position slide-tooth, $K^3$, closely approximates that of a center-position arc of the medial scroll-thread turn, said tooth $K^3$ being shown located (in this instance) in the thread-channel $n^2$ between said thread-turns T and $T^3$.

In Fig. $9^a$ the slide, D, is shown as having been moved outwardly from the aforesaid mid-stroke position thereof shown in Fig. 9 and, in Fig. $9^b$, the slide is shown as having been moved inwardly from said mid-stroke position, (in which,—as already indicated,— the described flexuring action normally subsides substantially to zero). In thus moving outwardly, the slide carries the series of the teeth to the positions here shown, Fig. $9^a$, in which the tooth $K^3$ of medial curvature is shifted into a coactive relation with the said outer arc $T^4$ of minimum curvature, and thereby producing an inter-flexuring action as between this thread-turn arc and the slide tooth $K^3$; also, in this operation, the said slide-tooth $K^5$ (this being of minimum normal curvature) is carried to the central position as here shown, thereby producing a deviating curvature-relation, and a resultant inter-flexuring action, as between this slide-tooth, $K^5$, and the contiguous thread-turn arcs T and $T^3$. Thus during any movement of said slide-teeth outwardly from said initial position, all of these slide-teeth have a changing curvature-relation, or alinement, relatively to the series of thread-turn arcs which, respectively, are in a coacting inter-engagement therewith, and are thus during such movement subjected to a progressively varying degree of the inter-flexuring modulation.

This mode of action, and the described results thereof, are the same during the in-stroke of the slide, as shown in Fig. $9^b$, excepting that the described progressive action is reversed, so that here said outer slide-tooth $K^4$, of least curvature is brought into a medial position where it directly coacts with thread-turn arcs, as T, $T^3$, of medial curvature, while the tooth, as $K^3$, of medial curvature is brought into direct coaction with the thread-turn arc, as $T^5$, of minimum curvature. In this manner (as also in Fig. $9^a$) the inter-flexuring takes place at successive times, in opposite directions, respectively, so that the magnitude of the necessary flexuring movement of the said arcs and teeth, being thus divided, is thereby reduced to a minimum total amount.

The several features and particular relations as above described in connection with Fig. 9, also appertain in detail to the modified arrangement illustrated in Fig. 8. Here, also, the inner and outer slide-teeth, $K^1$ and $K^7$, have a similar relation to each other and to the inner and outer thread-turns, $T^5$ and $T^4$, respectively, as have the corresponding members in Fig. 9. In this instance (Fig. 8) the slide, D, is made longer and is provided with a more extended series of the slide-teeth, of which the mid-position tooth, $K^3$, has the same relation to the scroll and its thread-turns, as in the former case,—the tooth $K^3$ has to its engaging slide-teeth T, $T^3$; also, the described curvature relations are the same in these two cases. However, in Fig. 8 the series of slide-teeth is greatly extended in number and length, thereby providing for the chuck jaws to have a long radial movement. While the total variation in the tooth-curvatures, in passing from outer tooth $K^7$ inwardly to the inner tooth $K^1$, corresponds (as before) to the difference in curvatures of said outer and inner thread-turns $T^4$, and $T^5$, (Fig. 8), there is the same relation as described of the mid-position tooth $K^3$, and of a mid-series of the teeth, as for instance, of the five teeth $K^8$ to $K^{11}$ inclusive.

In the arrangement of Fig. 7, the principal features and relations are the same as above explained in connection with Fig. 9 and Fig. 8; the mid-position tooth, as $K^3$, and a mid-series group of the slide-teeth have,—here, as before,—curvatures intermediate,—in degree of curvature,—between the curvatures, respectively, of the inner thread-turn $T^5$ of greater curvature, and the outer thread-turn $T^4$ of least curvature. As before, the curvature of the said mid-position tooth $K^3$, closely approximates that of a center-position arc of a medial scroll-thread turn; and, in each of these three arrangements, each slide-tooth in passing across the rotation-path of a plurality of thread-turns, comes into a slide-actuating contact with a regularly progressing change of thread-turn curvature. And, when a slide-tooth has the described "intermediate" curvature relatively to the series of thread-turns, this tooth is subjected to the described torsional flexure successively in opposite directions (see Figs. 5 and 6) when passing from one to the other side of a mid-zone line of the series of thread-turns. This peculiar relation and mode of functioning equally applies,—in said arrangement of Fig. 7, to all of the slide-teeth, since these teeth are here shown as having the curvature variation thereof,—as seen in Figs. 8 and 9,—now reduced to or closely to, zero, so that these teeth are, or now may be, in duplicate as to their specific size, cross-sectional form and longitudinal curvature, and as to the character and extent of their torsional flexuring in their coaction with the successive thread-turns,—this flexuring being elsewhere herein further explained.

One important object gained by said construction (Figs. 7, 8 and 9), whereby the mid-position slide-tooth has a curvature which is substantially an average of all the thread-turns curvature, is that the direction of the torsional flexuring will be reversed at successive positions, as stated; and that the extent of the necessary tooth-flexure will be thereby reduced to a minimum. By this means the slide-tooth is first flexed (in one position of the slide) only a small amount in one direction, and then in passing to another position of the slide, is next flexed a small amount in a reverse direction. This arrangement, in practice, provides for using slide-teeth having a thicker construction, and also of a greater length, than would otherwise be practically effective. These advantages are especially important not only in chucks for precision work, but also in chucks of large size and for severe service. Therefore, as will now be evident, a further advantage is gained, in said larger chucks for heavy work, by the said arrangement of Fig. 9, whereby all of the slide-teeth successively brought into action during a full-length slide-stroke, each have a minimum of the described torsional flexuring and since the series of teeth thereby offer a minimum of resistance to the rotation of the scroll-ring in proportion to the aggregate extent of surfaces in contact, and to the forces required for flexing and for overcoming friction, during their operation. A further advantage is that the slide may thus be made to have a stroke of unusually great length, and,—in operating the chuck,—may be run out of engagement and then be run again into engagement with the scroll-thread, either from the inside or from the outside of the scroll-ring, as occasion may require.

The extent, or range, of the curvature relations in any particular instance may be said to be directly modified or limited by the relative curvatures of the inner and outer thread-turns. For instance, in Fig. 11$^b$, an arc $T^4$, of the outer thread-turn of the scroll-ring S, (Fig. 9) is shown closely adjacent to the arc $T^5$ of the inner thread-turn of the same scroll-ring. Thus an arc, as $T^5$, of minimum curvature is compared with an arc, as $T^4$, having a maximum curvature, so that the difference in these curvatures is here represented (in an obvious manner) by the varying widths of the intervening space, $a$, at different points in the length thereof. And, if the width, as $a^1$, between lines $J^1$, $J^2$, be assumed to represent the width (in this particular instance), of the zone of thread-turns and slide-teeth inter-engagement, then the variation in width of said space, $a$, (between said zone-boundaries $J^1$, $J^2$) indicates the range of the inter-flexuring action normally required in this particular instance as illustrated in said Fig. 9.

These features and relations as appertaining to the construction as shown and proportioned in Fig. 8, are similarly and diagrammatically represented in Fig. 11$^a$, where the closely adjacent arcs $T^4$ and $T^5$, of the outer and inner thread-turns, respectively, are separated by a space, $a^2$, having a varying width (nearly corresponding to the said space $a^1$ of Fig. 11$^b$), between the zone-boundaries $J^1$, $J^2$.

Similarly, in Fig. 11, the outer and inner thread-turn arcs, $T^4$ and $T^5$, respectively, have an intervening space, $a^3$, which (between zone-boundaries $J^1$, $J^2$), diagrammatically represents by its varying widths at different points in the length thereof, the range of the described inter-flexuring action in the arrangement of said Fig. 7.

In order to obtain a sufficient mobility of the metal in the turns of the scroll-thread, these turns, even in chucks of large size, should be made relatively thin (measured radially of the scroll-ring) so that a proper flexing action will not be prevented. Accordingly, in said larger chucks, it is deemed necessary to use, in the series of scroll-thread turns, a larger number than heretofore commonly employed, and thereby provide for the jaw-slides to sustain a heavy pressure without overloading the scroll-thread, or unduly modifying the normal inter-flexuring action thereof.

However, in some instances it is desirable to provide for a more rapid movement of the jaw-slide (relative to the rotative movement of the scroll) and this may be accomplished by providing the scroll-ring with a multiple thread, this comprising two or more single threads arranged side by side. Thus in the diagrammatic view, Fig. 8, the "thread" is shown as having the two single threads $T^1$, so that one revolution of the ring S will actuate the jaw-slide, (here indicated by dotted lines at J) through the distance $J^3$, which extends over said pair of threads $T^1$. In the manner here explained, the necessary flexing action can be retained while increasing the otherwise slow rate of movement of the jaws. In the case of chucks of very large size, such a multiple scroll-thread may properly comprise three of the single threads, (see Fig. 7), each having a proportion within the limits needed for securing an effective flexing action. In practice, of course, the dimensions and proportions of all the parts must be such as to provide for a relatively free, or easy, flexing action, and these requirements are readily ascertainable by trial.

A leading feature of the aforesaid arrangements relates to a progressive changing of the extent of the flexures as between a jaw-tooth and a coacting pair of scroll-thread turns, during the passage of such jaw-tooth across a series of said turns. This movement, or passage, of said jaw-tooth being effected by repeated revolutions of the scroll-ring, the jaw-tooth first engages between one pair of turns, and is there flexed, or torsioned, into a full surface-contact therewith; and, ultimately passes in succession to each succeeding pairs of turns, each of these pairs being of a different diameter and curvature than any other pair.

For instance, in Fig. $9^a$ the jaw-tooth $K^5$ stands (in the flexed or torsional fit) between the two turns T and $T^3$. On turning the scroll-ring in direction of arrow $r^2$, through one revolution, said tooth $K^5$ will pass inwardly toward the scroll-axis, and slide along the tooth-channel $n^2$ through one full turn thereof, and then stand between the two thread turns $T^3$ and $T^5$, where the thread-curvature is somewhat increased while the base-lines curvature of the jaw-tooth remains the same. Thus, by continued operation, the tooth $K^5$ will be brought into a flexure but true surface-contact between the two inner turns $T^3$, $T^5$, which have a largely increased curvature as compared with said outer pair T, $T^4$. If the scroll-ring, S, be rotated in the opposite direction (shown by arrow $r^2$) then, of course, a jaw-tooth starting at said inner position gradually passes to and slides along between successive pairs of turns each having a lesser curvature than the next preceding pair of turns, Thus the jaw-tooth when moving in either said directions has the flexure and form thereof progressively changing during the movement thereof across the annular series of scroll-thread turns, since these turns, as above explained, are of a progressively changing diameter and curvature within the proportions necessary for such action.

It will be observed that when a plurality of contiguous thread and tooth sections are flexed into an inclined position,—as illustrated, for instance, in Fig. 15,—these members as $t^2$ and K, are thereby normally crowded more firmly together as measured along the meridian line $a^4$, but in practice the amount or proportion of variation thus produced has been proven, (by the operation of this chuck while used in practical machine-shopwork), to be so small as to be immaterial and not ordinarily discernable, since, in all ordinary cases, said variation can seldom be more than a small fraction of the one-thousandth part of an inch. The reason for this will be evident on noting the geometric relations of the line $K^2$ (Fig. 15) to the meridian line $a^4$ and to the other features, including the torsional flexure, already described in connection with Figs. 10 to $10^c$, inclusive.

A further object of the present improvements is to provide the chuck with effective means for overcoming,—by the avoidance thereof, an adverse condition and an impairment in operation, to which the scroll type of chuck has heretofore been peculiarly subject by reason of a "play" (or freedom of fitting) or of some form of "relieving", as between the scroll-thread and the sets of jaw-teeth which inter-engage therewith. For these purposes, the several jaw-teeth, as T, $T^3$ and $T^4$, (Fig. 5) are each to be provided with end-portions which in cross-section fully occupy the space between two adjoining turns of the scroll-thread. Also each of said jaw-tooth end-portions (as shown in Fig. 10) are constructed with sharp corners so that these pairs of oppositely disposed corners, (as $a^5$, $a^6$, Fig. 5), have the function of close-fitting clearing tools, or scrapers which bear respectively, against a pair of the oppositely-disposed thread-faces, as $a^7$, $a^8$.

Thus each said scraper-corner operates (when moving in one direction) to positively scrape and clean off a thread-surface of whatever gum, dirt or other débris which may have been collected thereon or adhere thereto, or may have collected within the channel between two next adjacent threads of the scroll. And, by thus constructing the end portions of all the jaw-teeth, the sets of these teeth (proportioned for the inter-flexuring) operate to effectively maintain the engaging faces of said teeth and of the scroll-thread, in a perfect working condition, and to prevent any such foreign substances from being drawn in between, or being compressed or packed between, the coacting load-bearing surfaces of the scroll-and-jaw mechanism.

The practical realization of the described advantages of said thread-surface-clearing action of the sharp-corner tooth-ends, (as explained in connection with said Figs. 5, 6, and 10$^a$), is provided for by the peculiar coactive flexing action of the scroll-thread and jaw-teeth illustrated in Figs. 10 to 10$^c$, inclusive. Since the scroll-thread, T, (see Figs. 1 and 3), consists of a plurality of turns, therefore these turns necessarily increase in degree of curvature from the outer turn, T$^4$, inwardly therefrom. And the teeth of said jaw-slide must also be made to correspondingly increase in curvature during their travel inwardly from said outer scroll-thread. Also, these teeth must have a considerable length in order that the said set of them in action at one time, shall be strong enough to sustain the intense pressures required for making the chuck serviceable for holding work in an accurate, and also in the rigid manner, as now found necessary in this class of shop-tools.

Figure 16 is a diagram explanatory of certain features of the progressively changing relations of the base-lines of a pair of the coacting force-transmitting faces, in a preferred form and arrangement thereof, one of these faces being a portion of a scroll-thread-face, and the other of them being the face of a jaw-tooth, and these base-lines being seen in a plan view; that is, in a direction vertical to the face of the scroll-ring, as indicated by arrow $a^9$ in Fig. 4. In this diagram, (Fig. 16), the arc-form zones $a^{10}$, $a^{11}$, $a^{12}$, $a^{13}$, $a^{14}$, $a^{15}$, represent concentric portions of a series of six turns of a scroll-thread of involute form and appurtenant to the scroll-ring S, these successive turns having a regularly increasing curvature from the outer said turn $a^{10}$ of minimum curvature to the inner said turn $a^{15}$, of maximum curvature.

In this diagram, (Fig. 16) the line $c^{10}$ represents one position, adjacent to the side $f^c$ of said thread-turn $a^{10}$, of the base-line of one side-face of a jaw-tooth, which has a curvature greater than said turn $a^{10}$. The same base-line $c^{11}$ is also shown at $b^{11}$ adjacent to the next scroll-thread turn $a^{11}$; and, is also shown at successive positions (and of the same curvature) at $b^{12}$, $b^{13}$, $b^{14}$, $b^{15}$, $b^{16}$ adjacent to, and equally near to, the successive thread-turns $a^{11}$, $a^{12}$, $a^{13}$, $a^{14}$, $a^{15}$ respectively. In said first position, $b^{10}$, said base-line $c^{10}$ has a curvature greater than the said first turn $a^{10}$, and these curvature relations progressively change at each of said successive positions, as at $c^{11}$, $c^{12}$, $c^{13}$, $c^{14}$, $c^{15}$, $c^{16}$ until in the latter position, adjacent to the inner thread-turn $a^{15}$, this base-line $c^{16}$, (while itself of a constant form) has a curvature less than that of said inner turn $a^{15}$. Thus the nature of the variation shown by the lines $c^{10}$, $a^{10}$, at the outer turn $a^{10}$, becomes reversed during the transition of said base-line to its position adjacent to the inner turn $a^{15}$. And, each of these specific kinds of variations are in effect overcome by means of the torsional flexing of the jaw-teeth and the coacting portion of the scroll-thread for bringing said faces thereof into a full surface-contact for the whole length of the said jaw-tooth face, and thus providing for a highly perfect and firm actuation and control at all times of the jaw slide by the scroll-ring.

The present system of securing a mechanically close surface-fit of the scroll-thread turns with the jaw-teeth by means of their mutual or coactive flexuring, overcomes, or completely eliminates, a serious obstacle to the making of a satisfactory fitting of said turns and jaw-teeth by any degree or form of "relief" applied to the jaw-tooth surfaces. This obstacle, as well-known to all experienced mechanics, has heretofore required the jaw-tooth to be given an excessive relief, because of a changing relation of a jaw-tooth to the scroll-thread during the travel of said tooth across the scroll. This feature is diagrammatically illustrated in the Figs. 9, 10, 11 and 15, and will be evident from a comparison of these views with each other and with the preceding description.

By a comparison of the several diagrams, it will now be evident how it has been necessary in scroll-chucks, to shape the jaw-tooth faces to have only a so-called "line bearing" against, and transversely of, the scroll-thread surface. These limitations are overcome in the present invention, first, by avoiding the said relieving of the tooth-face, and next by providing a construction (including suitable proportioning of the coacting parts), for permitting a flexuring of both scroll-thread and jaw-teeth whereby a surface modulation will be effected, and thereby a true "surface-contact" be substituted for the former "line contact."

When the said spiral scroll-thread turns are (or remain) unflexured the side surfaces of these thread-turns form the side-walls of a thread-channel which is then unmodulated as to its normal surface formation, and which is then of a uniform size and cross-sectional shape throughout the length thereof. Similarly, in the series of slide-teeth, (these being longitudinally only slightly deviating in alinement from a thread-turn arc normally coacting therewith), each of these teeth, normally has throughout the length thereof, and when unflexured,—a cross sectional size and shape uniform with the said size and shape of said thread-channel. Said thread-turns and the slide-teeth should, in practice, have their base-lines so proportioned and related, and so limited as to their deviation the one from the other, that by the inter-flexuring thereof where fully inter-engaging, the modulation in the form of their contacting surfaces will be within the limits of a lateral resiliency that is normal to these thread-turns and slide-teeth considered as operable members of the mechanism; and this resiliency should be sufficient to provide for the coactive torsional shaping of these members and surfaces to an extent for bringing the side-surfaces of the tooth-engaging thread-turn arcs and the side-faces of the slide-teeth, into a surface-to-surface bearing each with the other, and for producing these modulated forms and surface bearings for the full length of the slide-teeth side-faces.

One object of making the slide-teeth to have their base-lines (where these teeth are fixedly united to the slide) curved, and curved in the same direction as the thread-turns, is to secure a small range of deviation of the base-lines, this being desirable, in practice, in order to similarly limit the structural deviation between said thread-turn side-surfaces and said slide-teeth side-faces. Ordinarily,—especially in small chucks,—this object requires the said "base-lines" of the slide-teeth to have a considerable degree of curvature, this being, of or closely approximating, the described average of thread-turn curvatures, and to be in the same direction as said thread-turn curvature, but in some exceptional instances, as when the scroll has a large diameter and a small pitch, while the slide-teeth are of only a moderate length, these teeth may then have base-lines only slightly curved or substantially uncurved; in this case, however, the two said base-lines are regarded as having a curvature-relation considered as a coacting pair, since one of them is curved and the deviation of the two base-lines is brought within the working limits of the resiliency of said coacting thread-turn arcs and of said slide-teeth, and are thereby positioned, proportioned and fitted for having the described inter-flexuring action of the character and for the purposes herein set forth.

By comparing the several diagrams and the several features thereof as already explained, it will be obvious that the plurality of inter-engaging thread-turn arcs and slide-teeth, coact with an inter-flexuring action which, in order to be properly effective and not of a destructive character, should be well within the working limits of their resiliency. And, that in order to fully realize these advantages, the curvature relation as between the base-lines of said coacting arcs and teeth should be limited to a relatively small deviation, so that when said thread-turn arcs and the coacting slide-teeth shall be forcibly flexured into the required modulations of their normal forms, the dangers of breakage and of undue friction may be avoided. For these purposes, said coacting members are to be so positioned, proportioned and fitted that in said inter-flexuring thereof each said member will be torsionally shaped in a manner and to an extent for thereby bringing the said side-surfaces of said arcs and the said side-faces of the slide-teeth into the described extended surface-to-surface bearings each with the other.

The said deviations may be said progressively to occur,—or to run through the entire range thereof,—during each cycle of slide-movement, this cycle comprising one full slide-stroke in each direction. During this cycle, each slide-tooth face-line passes into and out from all the successive relations thereof to each of the several scroll-thread turns, and thus comes, at successive times, into positions of plus-curvature and minus-curvature relative to a scroll-thread-arc of medial curvature. And, during such cycle, the ranges of the plus-curvature relations and of the minus-curvature relations, respectively, are made substantially equal by so proportioning the several parts that when the slide is in or near to a mid-stroke position, one of the slide-teeth then in the zone of coaction will correspond in curvature with a thread-face arc then in engagement with the slide-face and located contiguous to that mid-stroke position.

It is deemed to be preferable, generally, and except in certain special cases, to make the tooth-curvatures in the form of arcs of circles, these being herein also designated as circular arcs; this construction of the slide-teeth is understood to be the one represented in Figs. 7, 8 and 10. In some instances, however, said tooth-curvatures are preferably made in the form of scroll-arcs, especially for use in chucks having the scroll-ring of a relatively small diameter, while the length of the slide-tooth extends over a considerable length of arc. This form and construction is understood to be the one illustrated in Fig. 9, and, while broadly within the scope and purview of the present invention, this specific improvement is intended to constitute subject-matter in, and to be further claimed in a separate application to be co-pending herewith.

In the principal views, including the several diagrams explanatory of the flexturing action, the thread-turns and jaw-teeth have been shown in the cross-sectional views thereof, as having side lines which are parallel, this form being deemed preferable under the more usual requirements. Thus, in Fig. 15 the side-faces of a slide-tooth, as K, are indicated by $K^2$ and $K^{12}$, respectively; similarly, in Fig. 12, the coacting side-surfaces of the thread-turn, $t^2$, are indicated by $f^d$ and $f^c$. In some instances, however, the said sectional forms may be modified and two of these modifications are shown briefly and by sectional views, in Figs. 17 and 18, respectively. In said first view, (Fig. 17), the jaw-slide-teeth, $g^2$, are provided on the undersides thereof with inclined faces, $e^2$, which engage correspondingly inclined side-surfaces, $e^3$, of the thread-turns, as $f^4$, which extend outward from the scroll-ring, $S^5$.

This construction provides means for effecting an adjustment of the inter-engagement of the slide with the scroll-ring, especially when, in a series of jaw-slides, each slide shall be carried by a separate bracket (not herein shown) adjustably fixed on the body-member, in accordance with a practice heretofore sometimes resorted to in the case of chuck-jaws being thus removably applied to the face of a large face-plate, as, for instance, for use on engine lathes. In this view, Fig. 17, the scroll-ring $S^5$, is indicated as having gear teeth, $2^a$, adapted to mesh with a small bevel-pinion, $2^b$, shown by dotted lines at $2^c$, this form of ring-actuation being well-known, need not be herein more particularly described, but it may be employed in place of the described screw-actuation of said ring, (Figs. 3 and 4) for making the body-member of suitable construction for such purpose.

A further modification of the inter-engaging slide-teeth and thread-turns is illustrated by the sectional view Fig. 18. In this form and arrangement the ring $S^6$ has the thread-turns, as $m^2$, thereof with inclined surfaces on each side thereof,—being thus slightly V-shaped,—and engaging with similarly shaped slide-teeth, as $f^3$, which project from a slide, as $J^4$, otherwise corresponding with the one shown at $J^5$ in Fig. 17. This form of the slide-and-ring device may be made adjustable in various ways, (not herein shown) of which the one above described (in connection with said Fig. 17), is deemed to be preferable for such instances as there indicated.

Having thus described my invention, I claim—

1. In a chuck-mechanism of the class described, in combination, a body-member provided with scroll-ring-supporting means and with jaw-slide guiding means; a scroll-ring rotatably supported by said scroll-ring-supporting means on the body-member, and having on an annular face-zone thereof, a scroll comprising a plurality of spirally-curved and laterally resilient thread-turns and also having between side-surfaces of said thread-turns (when these are unflexured) thread-channel turns each of uniform size and cross-sectional shape throughout the length thereof; a jaw-slide supported by said guiding means for sliding movements radially of the body-member and extending across and in front of and contiguous to said thread-turns of the scroll-ring, and having a series of thread-turns-engaging slide-teeth which project from the slide and are fixedly united at their base-lines to the slide, and are laterally-resilient at an outer edge thereof, and which, between side-faces thereof, and throughout the length thereof, each have (normally and when unflexured) a cross-sectional size and shape uniform with the said cross-sectional size and shape of a thread-channel, said slide-teeth also having base-lines positioned with a curvature relation as between these base-lines and the base base-lines of the thread-turns, and deviating (but only within the limits of their resiliency) from the base-line curvatures of the thread-turns, these thread-turns and said slide-teeth being proportioned and fitted for coacting with an inter-flexuring action thereof which consists in the torsional shaping of the slide-teeth and of tooth-engaging arcs of the thread-turns thereby coactively and resiliently to forcibly flex said slide-teeth and said thread-turn arcs into modulated forms, respectively, in which the outer edge of a slide-tooth is forced into a curvature coinciding with the base-line curvature of a coacting thread-turn arc, and in which the outer edge of a said thread-turn arc is forced into an alinement coinciding with the base-line of a coacting slide-tooth, and thereby bring the said side-surfaces of the tooth-engaging thread-turn arcs and the said side-faces of the slide-teeth, into surface-to-surface bearings each with the other.

2. In a chuck-mechanism of the class described, in combination, a body-member provided with scroll-ring-supporting means and with jaw-slide guiding means; a scroll-ring rotatably supported by said scroll-ring-supporting means on the body-member, and having on an annular face-zone thereof, a scroll comprising a plurality of spirally curved and laterally resilient thread-turns, and also having between side-surfaces of said thread-turns (when these are unflexured) thread-channel turns each of a uniform size and cross-sectional shape throughout the length thereof; a jaw-slide supported by said guiding means for a sliding movement radially of the body-member and extending across and in front of and contiguous to arcs of said thread-turns of the scroll-ring, and having projecting therefrom a series of slide-teeth with longitudinally curved side-faces, and each of which is fixedly united at its base to the slide and at its outer edge is laterally-resilient, and each of which throughout the length and between side-faces thereof and when un-flexured has a cross-sectional size and shape uniform with the said cross-sectional size and shape of said thread-channel, said slide-teeth also having their base-lines deviating (but only within the limits of their resiliency) from the base-line curvatures of tooth-engaging arcs of the thread-turns, and being positioned, proportioned and fitted for an inter-flexuring action thereof with said thread-turn arcs, and this inter-flexuring action consisting in the torsional shaping of the slide-teeth and of tooth-engaging arcs of the thread-turns thereby coactively and resiliently to forcibly flex said slide-teeth and said thread-turn arcs into modulated forms, respectively, in which the outer edge of a slide-tooth is forced into a curvature coinciding with the base-line curvature of a coacting thread-turn arc, and in which the outer edge of a said thread-turn arc is forced into a curvature coinciding with the base-line of a coacting slide-tooth, and thereby bring the side-surfaces of the tooth-engaging thread-turn arcs and the side-faces of the slide-teeth, into surface-to-surface bearings, each with the other, for the full length of the slide-tooth side-faces.

3. In a chuck-mechanism of the class described, in combination, a body-member provided with scroll-ring-supporting means and with jaw-slide guiding means; a scroll-ring rotatably supported by said scroll-ring-supporting means on the body-member, and having on an annular face-zone thereof, a spiral and laterally-resilient scroll-thread comprising a plurality of spirally-curved thread-turns, and also having between side-surfaces of said thread-turns (when these are un-flexured) thread-channel turns of uniform size and cross-sectional shape throughout the length thereof; a jaw-slide supported by said guiding means for sliding movements radially of the body-member and extending across and in front of and contiguous to arcs of said thread-turns of the scroll-ring, and having projecting therefrom a series of slide-teeth each of which is fixedly united at its base to the slide and at its outer edge is laterally-resilient, and each of which throughout the length and between side-faces thereof, and when un-flexured, has a cross-sectional size and shape uniform with the said cross-sectional size and shape of said thread-channel, said slide-teeth also having base lines with curvatures in the same direction as the curvature of said thread-turns, and deviating (but only within the limits of their resiliency) from the base-line curvatures of tooth-engaging arcs of the thread-turns, and being positioned, proportioned and fitted for an inter-flexuring action thereof with said thread-turn arcs, and this inter-flexuring action consisting in the torsional shaping of the slide-teeth and of tooth-engaging arcs of the thread-turns thereby coactively and resiliently to forcibly flex said slide-teeth and said thread-turn arcs into modulated forms, respectively, in which the outer edge of a slide-tooth is forced into a curvature coinciding with the base-line curvature of a coacting thread-turn arc, and in which the outer edge of a said thread-turn arc is forced into an alinement coinciding with the base-line curvature of a coacting slide-tooth, and thereby bring said side-surfaces of the tooth-engaging thread-turn arcs and said slide-faces of the slide-teeth, into surface-to-surface bearings each with the other.

4. In the slide-actuating mechanism comprising an operable scroll having on an annular face-zone thereof, a spiral and laterally-resilient scroll-thread extending through a plurality of thread-turns, and also having between side-surfaces of said thread-turns a thread-channel of uniform size and cross-sectional shape throughout the length thereof; the combination, with said scroll, of a slide supported transversely in front of and contiguous to arcs of said scroll-thread turns of the scroll and having a series of slide-teeth with curved side-faces, these slide-teeth being laterally-resilient and projecting from the slide and throughout the length thereof having a cross-sectional size and shape normally uniform with the said cross-sectional size and shape of said thread-channel, said slide-teeth also having curvatures deviating (but only within the limits of their resiliency) from the normal curvatures of tooth-engaging arcs of the thread-turns, and being positioned, proportioned and fitted for a coactive torsional shaping of the slide-teeth and of tooth-engaging arcs of the thread-turns, each by the other, and thereby coactively and resiliently so to modulate the surface forms of the slide-teeth and said thread-turn arcs, respectively, that the side-surfaces of the tooth-engaging thread-turn arcs and the side-faces of the slide-teeth, are brought into a full-fitting and tensioned surface-to-surface bearing each with the other.

5. In a chuck-mechanism of the class described, in combination, a body-member provided with scroll-ring-supporting means and with jaw-slide guiding means; a scroll-ring rotatably supported by said scroll-ring-supporting means on the body-member, and having on an annular face-zone thereof a flexurable scroll-thread extending through a plurality of thread-turns, and also having between said thread-turns a thread-channel of uniform size and cross-sectional shape throughout the length thereof; a jaw-slide supported by said guiding means for a sliding movement radially of the body-member and extending across and in front of and contiguous to said scroll-thread turns, and also having a series of curved and flexurable slide-teeth projecting from the jaw-slide and which throughout the length thereof have a cross-sectional size and shape normally uniform with the said cross-sectional size and shape of said thread-channel, and proportioned for an inter-engaging thereof with said thread-turns with a coacting flexuring of the thread-turns and of a plurality of said teeth, and thereby coactively effect a torsional shaping of each to and by the others (during the period and extent of their coaction), for thereby actuating the jaw-slide by surface-contacts which extend throughout the length of each of the series of slide-teeth, and (during successive rotations of the scroll-ring in either direction) maintain a full-fitting surface-to-surface engagement between surfaces of the scroll-ring and surfaces of slide teeth, and throughout the working stroke of the jaw-slide.

6. In a chuck-mechanism of the class described, in combination, a body-member provided with scroll-ring-supporting means and with jaw-slide guiding means; a scroll-ring rotatably supported by said means on the body-member, and having an annular face area for a scroll-thread; a jaw-slide slidably supported by said guiding means for a sliding movement radially of the body-member and extending across and in front of said annular face of the scroll-ring, said scroll-ring having thereon a scroll-thread extending spirally upon the scroll-ring-face and through a series of thread-turns thereon, and comprising a medial thread-turn and medial thread-turn arc, and said radially-moving slide having a series of scroll-thread-engaging teeth, and in this series having a plurality of mid-series teeth each conforming to a curvature that is intermediate (in degree of curvature) between the greater curvature of the inner said thread-turn and the smaller curvature of the outer said thread-turn, and said series of slide-teeth also having a mid-position one of them that has a curvature intermediate (in degree of curvature) between the curvatures of said inner and outer thread-turns, and has the curvature thereof substantially an average of the thread-turn curvatures of the series of scroll-threads, and thereby has said curvature of said mid-position slide-tooth closely approximating the herein described center-position arc of the medial thread-turn, and thereby provide for a reversal of the torsional flexure of the slide-tooth during the passing of this tooth from an inner zone to an outer zone of the annular area occupied by said spiral scroll-thread.

7. In a scroll-and-slide mechanism, in combination, a body-member provided with scroll-supporting means and with slide guiding means; a scroll rotatably supported by said means on the body-member, and having a laterally resilient scroll-thread; a slide supported by said guiding means for a sliding movement across and in front of said scroll, said scroll having thereon a scroll-thread extending spirally through a series of thread-turns thereon, and said slide having a series of laterally-resilient scroll-thread-engaging teeth, and in this series having a plurality of mid-series teeth conforming, respectively, to curvatures that are intermediate (in degree of curvature) between the greater curvature of the inner said thread-turn and the smaller curvature of the outer said thread-turn, substantially as described.

8. In a scroll-and-slide mechanism, in combination, a body-member provided with scroll-ring-supporting means and with slide guiding means; a scroll-ring rotatably supported by said means on the body-member, and having thereon a spiral and laterally-resilient scroll-thread extending through a plurality of thread-turns; a slide supported by said guiding means for a sliding movement across and in front of said scroll-ring, and said slide having a series of curved and laterally-resilient scroll-thread-engaging teeth each of a uniform cross-sectional size and shape throughout its length and proportioned for an inter-flexuring and coacting engagement with the thread-turns, and in this series having a plurality of mid-series teeth which are intermediate (in degree of curvature) between the greater curvature of the inner said thread-turn and the smaller curvature of the outer said thread-turn, and said series of slide-teeth also having a mid-position one of them that has a curvature that is substantially an average of the thread-turn curvatures of the series of scroll-threads, and thereby provide for a reversal of the torsional flexuring of a slide-tooth during the passing of this tooth from an inner zone to an outer zone of the annular area occupied by said spiral scroll-thread.

9. In a chuck-mechanism of the class described, in combination, a body member; a concentrically-disposed scroll-ring and a radially-disposed jaw-slide both removably supported on the body-member in positions for having, respectively, rotating and reciprocating movements, and separated by a space for the inter-engaging therein of thread-turn arcs with jaw-slide teeth; a scroll-thread rigidly-united at the base-line thereof upon the scroll-ring and extending through a plurality of thread-turns having between them a thread-channel of uniform size and cross-sectional shape throughout its length, said thread-turns being, respectively, of progressively increasing base-line curvatures from an outer turn to an inner turn thereof; a series of slide-teeth projecting from the jaw-slide and positioned for inter-engaging with arcs of said thread-turns, and each having a cross-sectional size and shape uniform with the said size and shape of said thread-channel, said teeth having base-line curvatures similarly arranged but deviating from the corresponding said curvatures of the thread-turns; and, said thread-turns and slide-teeth being proportioned and inter-engaging for the coactive inter-flexuring thereof, and thereby bring said turns and teeth (within the range of their engagement) each into a torsioned surface-to-surface bearing with others thereof.

10. In a chuck-mechanism of the class described, in combination, a body-member; a rotatable scroll-ring having a plurality of scroll-thread-turns of a spiral and uniform pitch, and also having between said thread-turns thread-channel turns each of a uniform size and cross-sectional shape throughout the length thereof; a jaw-slide supported for sliding movements across and in front of the scroll-ring, and also having a series of thread-turns-engaging slide-teeth projecting from the jaw-slide and which throughout the length thereof have a cross-sectional size and shape uniform with the said cross-sectional size and shape of said thread-channel, said thread-turns and slide-teeth being inter-engaged with each other by a forced and coacting flexuring which thereby effects a torsional shaping of each to and by the others and with surface-to-surface contacts; and these teeth having full-formed end-faces the corners of which are positioned and fitted to act as thread-turn-surface cleaning-scrapers during the rotation of the scroll-ring, and thereby protect said contacting surfaces of the flexured thread-turns and slide-teeth from the entrance of foreign matter therebetween during a progressive variation in the inter-flexuring which takes place during said operating of the scroll-ring and slide.

11. In a chuck-mechanism of the class described, in combination, a body-member provided with scroll-ring-supporting means and with jaw-slide guiding means; a scroll-ring rotatably supported by said scroll-ring-supporting means on the body-member, and having on an annular face-zone thereof, a scroll-thread comprising a series of thread-turns uniform in thickness and spacing and of a progressively increasing curvature from the outer said turn inwardly therefrom; and a jaw-slide having a series of curved jaw-teeth each of a thickness to closely fill the said spaces of the scroll-thread turns, and having the curvature thereof averaging the curvature substantially of one of said turns, and proportioned for being torsionally formed by coaction with a pair of said turns to fill the space between any two adjacent said turns, and for being progressively reformed in the torsioning thereof during a sliding movement of this tooth between said turns in passing from a pair of turns of one curvature to a pair of turns having a different curvature.

12. In a chuck-mechanism of the class described, in combination, a body member; a concentrically-disposed scroll-ring and a radially-disposed jaw-slide both removably supported in the body-member in positions for having, respectively, rotating and reciprocating movements, and separated by a space for the inter-engaging therein of thread-turn arcs with jaw-slide teeth; a scroll-thread laterally-resilient and rigidly-united at the base-line thereof upon the scroll-ring and extending through a plurality of thread-turns having between them a thread-channel of uniform size and a cross-sectional shape throughout its length, said thread-turns being, respectively, of progressively increasing base-line curvatures from an outer turn to an inner turn thereof; a series of slide-teeth projecting from the jaw-slide and positioned for inter-engaging by a coacting inter-flexuring thereof with arcs of said thread-turns, and each having a cross-sectional size and shape which throughout its length is uniform with the said size and shape of said thread-channel, and said slide-teeth also consisting of a series longer than the series of scroll-thread arcs, and having said series of teeth of a progressive variation in curvature from an outer tooth which has a curvature corresponding with the curvature of said outer thread-turn arc, said series extending to an inner tooth which has a greater curvature that corresponds with the curvature of said inner thread-turn arc; and having in this tooth-series a mid-position tooth of a curvature which is an average of the curvatures of the series of slide-teeth and also of the thread-turn arcs, and which also substantially corresponds with an average curvature of said thread-turns, thereby to provide for a slide-stroke of a length greater than the radial range of the thread-turns while minimizing the extent of the tooth-flexures and equalizing the reversed flexurings of the teeth which occur at the out-stroke and the in-stroke positions, respectively, of the jaw-slide, said flexuring at said instroke position involving slide-teeth of one range of base-line curvatures in coaction with an outer thread-turn arc of minimum thread-curvature, and at said out-stroke position involving slide-teeth of a different range of base-line tooth-curvatures in coaction with an inner thread-turn arc of maximum thread-turn curvature.

13. The herein described improvement in the art of scroll-thread actuation of a mechanism slide, which consists first, in providing a rotatable scroll with a plurality of laterally resilient and variably-curvatured thread-turns, and with a slide having a series of scroll-thread-engaging slide-teeth which are laterally-resilient and of a curvature substantially averaging (in degree of curvature) the several curvatures comprised in the said plurality of thread-turns, but having base-lines deviating from the base-lines of the thread-turns, and these slide-teeth being throughout the length thereof of a cross-sectional size and shape corresponding to the size and shape of a thread-channel extending between successive thread-turns of the scroll; and, second, in inter-flexuring the engaging slide-teeth and coacting thread-turn arcs (within the working limits of their resiliency), into coacting and torsionally-modulated surface-forms, and thereby bring the thread-turn arcs and coacting slide-teeth into surface-to-surface and tensioned inter-engagement and bearing contact through the length of the slide-teeth; and third, maintaining said inter-flexuring while rotating the scroll for thereby actuating the slide.

14. The herein described improvement in the art of actuating by means of a scroll having a plurality of laterally resilient thread-turns having, respectively, variably-curvatured base-lines, and by means of mechanism-slides each having a series of scroll-thread-engaging slide-teeth which are laterally-resilient and of a curvature substantially averaging (in degree of curvature) the several curvatures comprised in the said plurality of thread-turns, but having base-lines deviating from the base-lines of the thread-turns, and these slide-teeth being throughout the length thereof of a cross-sectional size and shape corresponding to the size and shape of a thread-channel extending between successive thread-turns of the scroll, said improvement in the art consisting in inter-flexuring the engaging slide-teeth and coacting thread-turn arcs (within working limits of their resiliency), into torsionally-modulated forms, in which the outer edges of a series of thread-turn arcs are torsioned into curvatures coinciding, respectively, with the base-line curvatures of a series of coacting slide-teeth, and in which the outer edges of the coacting slide-teeth are torsioned into curvatures coinciding, respectively, with the base-line curvatures of the coacting thread-turn arcs, and thereby bring the thread-turn arcs and coacting slide-teeth into surface-to-surface and tensioned bearing-surface contacts throughout the length of the slide-teeth, and then maintaining said inter-flexuring during a rotary movement of the scroll for thereby actuating the slide.

FRANK C. SMART.